US011645636B2

(12) United States Patent
Gandhi et al.

(10) Patent No.: US 11,645,636 B2
(45) Date of Patent: May 9, 2023

(54) ENABLING USER TO USER INTERACTIONS IN MULTI-USER VIDEO CONFERENCE APPLICATIONS

(71) Applicant: PAYPAL, INC., San Jose, CA (US)

(72) Inventors: Saumil Ashvin Gandhi, Sunnyvale, CA (US); Sandeep Bhalla, Leander, TX (US)

(73) Assignee: PAYPAL, INC., San Jose, CA (US)

( * ) Notice: Subject to any disclaimer, the term of this patent is extended or adjusted under 35 U.S.C. 154(b) by 1 day.

(21) Appl. No.: 17/382,987

(22) Filed: Jul. 22, 2021

(65) Prior Publication Data

US 2023/0025638 A1     Jan. 26, 2023

(51) Int. Cl.
| | | |
|---|---|---|
| *G06Q 20/30* | (2012.01) | |
| *G06Q 20/10* | (2012.01) | |
| *G06F 3/04817* | (2022.01) | |
| *G06F 9/54* | (2006.01) | |
| *G06Q 40/02* | (2023.01) | |
| *G06Q 20/12* | (2012.01) | |
| *G06Q 20/40* | (2012.01) | |
| *H04L 65/402* | (2022.01) | |

(52) U.S. Cl.
CPC ....... *G06Q 20/108* (2013.01); *G06F 3/04817* (2013.01); *G06F 9/54* (2013.01); *G06Q 20/123* (2013.01); *G06Q 20/306* (2020.05); *G06Q 20/4014* (2013.01); *G06Q 40/02* (2013.01); *H04L 65/4025* (2022.05)

(58) Field of Classification Search
USPC .................................................. 705/35–45
See application file for complete search history.

(56) References Cited

U.S. PATENT DOCUMENTS

| | | | |
|---|---|---|---|
| 10,264,215 B1* | 4/2019 | Sadanand | G06Q 20/4014 |
| 2002/0055835 A1* | 5/2002 | Carcoba Olivares | G06Q 20/18 |
| | | | 704/9 |
| 2007/0255620 A1* | 11/2007 | Tumminaro | G06Q 30/0226 |
| | | | 705/40 |

* cited by examiner

*Primary Examiner* — William E Rankins
(74) *Attorney, Agent, or Firm* — Haynes and Boone, LLP (57) ABSTRACT

There are provided systems and methods for enabling user to user interactions in multi-user video conference applications. A user may utilize a computing device to interact with online service providers in order to initiate and/or join a video conference with one or more other users. During the video conference, the user may be provided with options to interact with other users, such as by engaging in electronic transaction processing. When performing such interactions, data for the video conference may be extracted and provided to a transaction processor server. The server may then utilize the data to determine accounts of users within the video conference that may be utilized for electronic transaction processing services. If no account exists, the server may initiate a process to onboard such users. When an account exists, the server may further populate graphical icons that may be used for electronic transaction processing services.

20 Claims, 5 Drawing Sheets

ENABLING USER TO USER INTERACTIONS IN MULTI-USER VIDEO CONFERENCE APPLICATIONS

TECHNICAL FIELD

The present application generally relates to video conference applications and systems and more particularly to enabling interactions between users using a separate service provider system for video conferencing services.

BACKGROUND

Users may utilize online service providers for various video conferencing services, such as Zoom™, Microsoft Teams™, Cisco WebEx, and the like. These video conferencing and other video chat services may allow users to converse and view video of other users during conversations. The video may be used to show products, items for sale, and the like, as well as provide a more personalized atmosphere to users during meetings and conversation. However, video conferencing services merely allow users to converse and share video. Other text and chat interactions may be enabled, but not interactions to utilize electronic transaction processing and other services provided by different service providers. These other external service providers may not have their services enabled through the video conferencing services and platforms. Thus, it is desirable to detect when video conferencing services are used by a computing device and user and enable external computing services from other service providers during a video conference between different users.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for enabling user-to-user interactions in multi-user video conference applications. Systems suitable for practicing methods of the present disclosure are also provided.

A user may utilize an online service provider to perform various data processing including video conferencing (VC) and/or otherwise interacting with computing devices and available computing services via a VC application, website, and/or computing platform. However, use of these services may merely provide video conferencing with other users, which exchanges voice, audio, and/or video data through audiovisual content and data exchanged between computing devices. When other computing resources and services are requested, the user may need to navigate to those corresponding online platforms and/or applications, enter data, and commence with utilizing the computing services. For example, an online transaction processor (e.g., PAYPAL®, VENMO®, etc.) or other service provider may provide electronic transaction processing services to users on one or more applications or websites, but these services may not be provided in a VC platform and/or application. To reduce friction and improve a user's experience with the service provider providing VC services, the transaction processor may utilize device plugins, client install package data and operations, applications, components, and/or signaling to detect when a VC application and communication session is initiated and/or initialized via the corresponding VC platform. For example, the transaction processor may detect VC data streaming and/or transmissions between devices, as well as the start of a video conference via a web or device-side application (e.g., a website application, rich Internet application, resident device software application, mobile application, or the like).

Thereafter, the online transaction processor may utilize additional device components, operations, and processes to extract data from the video conference. The extracted data may correspond to user identifiers for users within the voice conference and that have joined or are using the VC service, application, and/or platform. The user identifiers may be used to identify whether users have an account with the transaction processor, which may correspond to a payment account, digital wallet, or the like used for payment and transfer services. The transaction processor may further use the plugin or application operations to cause an interface icon to be displayed with the VC application and/or interface (e.g., within a window for a video conference). The icon may enable electronic transaction processing between different participant users in the video conference through the computing services and platforms of the transaction processor. If the icon is selected or otherwise interacted with by a user during the video conference, the transaction processor may then populate and/or provide processes to process transaction data for electronic transaction processing between users in the video conference. Further, the transaction processor may automate content output on the computing device to improve the user experience and/or provide relevant data for electronic transaction processing during the VC services.

In this regard, the transaction processor may provide a browser tool, add-on, extension, or the like, as well as a resident dedicated application (e.g., mobile application), that may monitor device and/or user activities and interactions when initiating and/or during use of VC services (e.g., with a VC platform that may provide an application and/or website for VC services). For example, a user may wish to process a purchase of one or more items in a transaction. Selection of one or more items during an online transaction with a merchant website may require a payment instrument from the user for electronic transaction processing. A user may pay for one or more transactions using a digital wallet or other account with an online service provider or transaction processor (e.g., PayPal®), as well as the payment card. An account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions for items and digital gift cards (e.g., exact amount digital gift cards for detected transaction totals). However, in other embodiments, the account creation may be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

A user may utilize VC services that include a plugin, application operation or process, and/or software application having application programming interface (API) integration for data sharing with a transaction processor for electronic transaction processing services during video conferences. The transaction processor may therefore provide a plug-in or add-on for a web browser, software code for operations that are part of a client device application install package, or a separate application that integrations and exchanges data with other software applications and/or web browsers. The transaction processor may install the processes to integrate with the VC services, applications, and/or webpages on a user's client device. Once installed, the transaction processor's software processes and operations may be used to integrate with the VC services and detect when a video conference is initiated and/or performed with other computing devices and participant users.

When a video conference is detected, such as when a VC application or webpage initiates the video conference, fetches or retrieves a meeting identifier for the video conference, and/or obtains user details and data for users in the video conference, the transaction processor's operations to integrate with the VC services may be initiated. This may include extracting user data for the users participating in the video conference. The user data may correspond to an email address, phone number, account identifier, or the like that may be used to determine whether each user has an account with the transaction processor and/or to sign the user up for an account. In some embodiments, the user data may include a name or other more general user data that can be extracted but may be used for additional risk and fraud security models for a higher confidence that an account belongs to a user. Additional data may also be extracted with the meeting identifier, user data, or the like. For example, chat data may be extracted to determine transaction data for a transaction having items, a cost associated with the video conference, and other information for electronic transaction processing.

Once the data is extracted, the online transaction processor may identify if each user has a digital account and/or digital wallet with the transaction processor. If a user does not have an account with the transaction processor, then the transaction processor may provide a process to onboard with the transaction processor and create an account for electronic transaction processing via the transaction processor. A signup email, text message, instant message, or the like may be provided to users without accounts, which may include a link and/or process to sign up. A link or process to sign up may also be posted and provided in a chat for the video conference via the plug-in or operations, which may be a general message and/or specifically targeted to certain users (e.g., through a private message). In some instances, the sign up process can be initiated at the time the online transaction processor identifies a user as not having a digital account and/or digital wallet with the transaction processor. Alternatively, the sign up process may be initiated at a later time, e.g., after a transaction has been executed without the user having signed up. In other words, the user may enter information (e.g., name, address, credit card number, etc.) to execute the transaction, and this information may be saved by the online transaction processor to later facilitate the sign up process.

In further embodiments, a graphical icon, such as an interface icon within an interface or window for the video chat, may be populated, displayed, and presented with the video conference, such as in a cell or portion of the interface that displays the user's video for the video conference. The sign-up process may also preload data for the user for signing up for an account based on the extracted data from the video conference.

If a user does have an account and/or completes a sign up for an account, the transaction processor may display an interface graphical icon associated with electronic transaction processing using the transaction processor. This may correspond to a graphical icon that is associated with the transaction processor (e.g., a brand or designed of the transaction processor, such as a trademarked or stylized name for the transaction processor). Selection and/or interaction with the icon may initiate a process for electronic transaction processing. For example, selection of the icon may initiate a transaction to provide a payment to another user. In some embodiments, the graphical icon may be displayed with a particular user different from the user viewing the user interface for the video conference, which may initiate the transaction from the viewing user to the selected user in the video conference. However, with the viewing user initiating the transaction, a general icon may be displayed, which may be moved to another user for initiating a transaction with the user. The transaction may be an outgoing payment request (e.g., sending a payment or funds to another user) or may request a payment from the other user (e.g., a requesting a payment or funds from the user). In some embodiments, more than one icon may be used, where different coloring and/or shapes of the icons may indicate whether the transaction request is a "send payment" or "request payment" transaction processing request. The transaction processor may further monitor the users within the video conference and whether they have an account (e.g., have completed a sign up) to refresh a list of participants, send additional sign up links, change and/or display graphical icons within the interface, and the like.

If a transaction is initiated via the graphical icon during the video conference, the transaction processor may receive an identification of the initiation via the plug-in, application operation, and/or software application. The transaction processor may then determine the accounts for processing the transaction. If no account exists for the transaction participant users, a sign-up notification may be transmitted to the user lacking the account. However, the user receiving the payment or funds may not be required to have an account and an account of the sending user may be used to transmit funds that are held for the recipient to sign up for an account and receive funds. In such embodiments, the sent funds may be held in a temporary account so that the funds may be released to the recipient if an account is established for the recipient or may be revert to the sender after an amount of time passes with no account creation. Further, if the sender does not have an account, the sender may provide credit card details or another payment instrument. Using the sender's identifier that was extracted from the video conference and the credit card, an initial account for the sender may further be established. The sender may provide further authorization and/or authentication information at the time of account signup and/or payment processing or may later be provided a link to verify account details and set additional authentication. The sender may therefore be onboarded at a time of a payment during the video conference.

The transaction processor may further determine transaction data for transaction processing, such as an amount of transaction processing of the transaction, payment, or transfer, one or more items for the transaction, additional transaction fees or costs, shipping and/or billing information, and the like. This may be determined from data extracted for the video conference from the VC service and/or may be set with the video conference when the video conference is established (e.g., with the meeting identifier). For example, a user performing fund raising, providing a class or program, selling items, or the like via the video conference may establish transaction details for payments prior to or at the start of the video conference. This may also be changed during the video conference and may be set and/or changed by user using operations and functionalities provided by the transaction processor for the VC services using the plug-in, application operations, and/or other application that exchanges data and/or API calls between applications. In other embodiments, the users participating in the transaction may enter the transaction data when or after the icon is selected. For example, selection of the icon may cause a window or menu to be opened or populated, where users may enter transaction data. Transaction data may also be extracted from chat data, such as using natural language processing or the like. Further, voice data processing may also be used to extract or determine transaction data, as well as video data and image processing and/or object rejection (e.g., an item and/or cost being displayed in the video conference). In some embodiments, selection of the particular user or their corresponding icon, movement of the icon to the user, and/or color or shape of the icon designating a send or request payment request may further be used to determine the transaction data for entry to the transaction processing.

Thereafter, the transaction processor may process an electronic transaction between the users. In some embodiments, the electronic transaction may be a multicast transaction, such as a many to one, one to many, or many to many transaction between more than two transaction participant users. The user accounts may be identified using the identifiers, and a payment instrument for the account may be determined. In some embodiments, the payor user may be provided with an option or process to select the payment instrument or a default payment instrument may be used. Using the payment instrument, an electronic transaction sending a payment from one or more users to one or more other users may be processed. After transaction processing, a transaction history may be generated and may be provided to a contact address or identifier. In this manner, functionalities between multiple different computing systems and infrastructures may be shared, integrated, and/or combined. This facilitates faster and more efficient transaction processing while providing data processing resources through a single interface. Thus, the transaction processor may provide an enhanced and improved user interface for VC services incorporating other external computing services. Further, this reduces the number of navigations and additional network resources consumed when using multiple different online platforms and computing resources, which provides faster and more coordinated data transmissions between computing systems.

Figure 1:
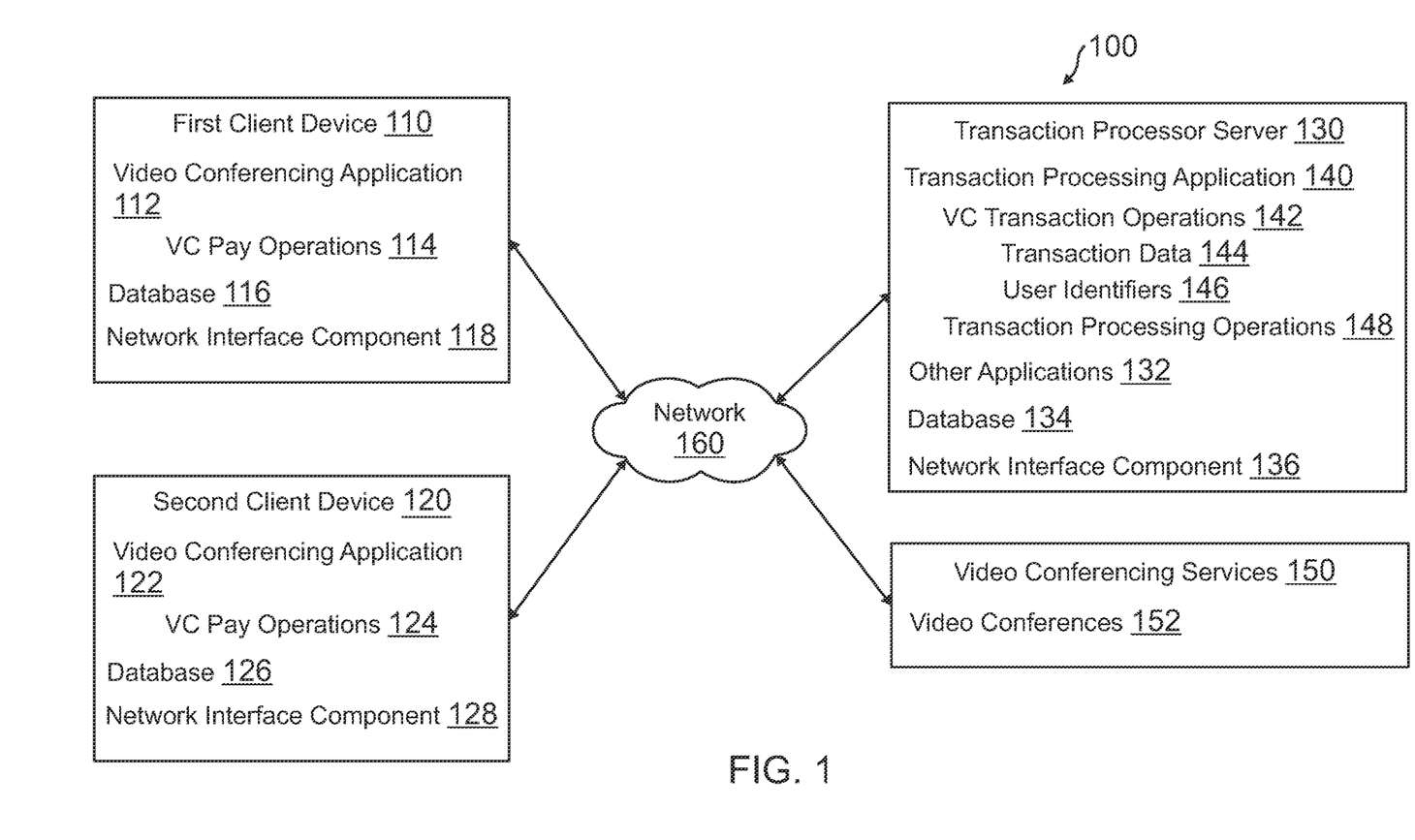
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a first client device 110, a second client device 120, a transaction processor server 130, and VC services 150 in communication over a network 160. First client device 110 may be used to interact with one or more service providers, including VC services 150 to perform video conferencing with second client device 120. First client device 110 may initiate a transaction with second client device 120 through an interface provided with a video conference 152 from video conferencing service 150. Transaction processor server 130 may process the transaction based on transaction data for video conference 152.

First client device 110, second client device 120, transaction processor server 130, and VC services 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

First client device 110 and second client device 120 may be implemented using any appropriate hardware and software configured for wired and/or wireless communication with transaction processor server 130 and/or VC services 150 for utilizing services and/or receiving automated content output during service use. First client device 110 and second client device 120 may correspond to an individual user, consumer, or merchant that utilizes a network and platform provided by transaction processor server 130 to access and use computing services, which may include electronic transaction processing services provided via video conferencing 150. In various embodiments, first client device 110 and second client device 120 may be implemented as a personal computer (PC), a smart phone, laptop/tablet computer, wristwatch with appropriate computer hardware resources, other type of wearable computing device, and/or other types of computing devices capable of transmitting and/or receiving data. Although two computing devices are shown as interacting, a plurality of computing device may function similarly.

First client device 110 of FIG. 1 contains a video conferencing application 112, a database 116, and a network interface component 118. Second client device 120 of FIG. 1 contains a video conferencing application 122, a database 126, and a network interface component 128. Video conferencing applications 112 and 122 may correspond to executable processes, procedures, and/or applications with associated hardware. In other embodiments, first client device 110 and/or second client device 120 may include additional or different software as required.

Video conferencing applications 112 and 122 may correspond to one or more processes to execute modules and associated components of first client device 110 and second client device 120 to provide a convenient interface to permit users for first client device 110 and second client device 120 to join video conferences and conduct VC with other users, as well as enter, view, and/or process data for electronic transaction processing. In this regard, video conferencing applications 112 and 122 may correspond to specialized hardware and/or software utilized by first client device 110 and second client device 120 that may provide access to services, including VC services through VC services 150 and perform electronic transaction processing for the items or payments in video conferences via transaction processor server 130. Access and use of services may be provided through a user interface enabling the corresponding user to access VC services and engage in VC with other users. The user interface may further be used to request data processing and/or other services provided by transaction processor server 130 using icons or other interface elements displayed in the user interface during video conferences, including allowing a user to enter and/or view transactions during video conferences. In various embodiments, video conferencing applications 112 and 122 may correspond to a general browser application configured to retrieve, present, and communicate information over the Internet (e.g., utilize resources on the World Wide Web) or a private network. For example, video conferencing application 112 may provide a web browser, which may send and receive information over network 160, including retrieving website information, presenting the website information to the user, and/or communicating information to the website, including payment information for the transaction. Such webpages accessed by a web browser may correspond to a video conference, such as by selecting a link for a video conference.

In other embodiments, video conferencing applications 112 and 122 may include a dedicated software application of VC services 150 that resides on first client device 110 and/or second client device 120, which may be configured to assist in processing transactions electronically during a video conference, such as a mobile application on a mobile device. Video conferencing applications 112 and 122 may include a data tracker used to track data for a user associated with first client device 110 and/or second client device 120 when the user performs VC with other users, such as when a user joins a video conference and/or engages in VC services. The data tracker may correspond to a client data package that installs code for operation of video conferencing applications 112 and 122 and/or an application or browser extension, add-on, or plugin. These operations may include operations to monitor and track device data of device activities and interactions that may initiate a video conference and/or engage in VC services.

Accordingly, video conferencing applications 112 and 122 may provide a window, interface, or other application field/element that allows for viewing of content during a video conference that is presented to a user. The content may be audiovisual content and may include video, an image, or other representation of another user (e.g., icon and/or identifier), as well as output audio of those users. Video conferencing applications 112 and 122 may therefore include a user interface and/or window for an application or web browser in a graphical user interface (GUI) of first client device 110 and/or second client device 120. A video conference may include multiple cells for different participating users in the video conference and may also display names and/or identifiers (e.g., phone numbers, email addresses, account or login names or identifiers, etc.) for the users. The video conference may further be displayed with a chat window or the like. When the video conference is started and/or during the video conference, the operation, plug-in, or the like for VC pay operations 114 and 124 may further extract and determine data for the video conference, such as user data for user identifiers and the like and/or a meeting identifier that may be used to look up user identifiers and/or transaction data for transactions or items for purchase during the video conference. VC pay operations 114 and 124 may therefore be provided by transaction processor server 130.

During the video conference, payments and transactions may be processed between users using graphical icons, interface elements, or other interface icons or representations that initiate a process for the electronic transaction processing via VC pay operations 114 and 124. Selection of an icon may initiate an operation to provide a payment to another user to a transaction or transfer using VC pay operations 114 and 124. Video conferencing applications 112 and 122 may further provide menus or interface fields to enter transaction data, or such data may be determined using a meeting identifier or the like for the video conference. The data may also be set by one or more users when inviting other users to the video conference, starting the video conference, and/or when joining or conducting the video conference. The plug-in, software operation, or the like of VC pay operations 114 and 124 may therefore determine and/or extract the user data and/or transaction data, which may be provided to transaction processor server 130 for data processing, account identification, onboarding and account setup requests, and/or graphical icon population within video conferencing applications 112 and 122.

First client device 110 and second client device 120 may further include databases 116 and 126 which may include, for example, identifiers such as operating system registry entries, cookies associated with video conferencing applications 112 and 122 and/or other applications, identifiers associated with hardware of first client device 110 and/or second client device 120, or other appropriate identifiers. Identifiers in databases 116 and 126 may be used by a payment/service provider to associate first client device 110 and/or second client device 120 with a particular account maintained by the payment/service provider, such as transaction processor server 130. Databases 116 and 126 may also further store VC service data for one or more video conferences.

First client device 110 and second client device 120 include network interface components 118 and 128 adapted to communicate with transaction processor server 130 and/or VC services 150 over network 160. In various embodiments, network interface components 118 and 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor server 130 may be maintained, for example, by an online service provider, which may provide operations for detecting VC service usages and providing electronic transaction processing services during VC. Various embodiments of the VC and electronic transaction processing system described herein may be provided by transaction processor server 130 and may be accessible by first client device 110 and second client device 120 when accessing a website or application provided by transaction processor server 130 and/or VC services 150. In such embodiments, transaction processor server 130 may interface with first client device 110 and second client device 120 to provide electronic transaction processing services in conjunction with VC services 150. Transaction processor server 130 includes one or more processing applications which may be configured to interact with first client device 110, second client device 120, and VC services 150. In one example, transaction processor server 130 may be provided by PAYPAL®, Inc. of San Jose, Calif., USA. However, in other embodiments, transaction processor server 130 may be maintained by or include another type of service provider.

Transaction processor server 130 of FIG. 1 includes a transaction processing application 140, other applications 132, a database 134, and a network interface component 136. Transaction processing application 140 may correspond to executable processes, procedures, and/or applications with associated hardware. In other embodiments, transaction processor server 130 may include additional or different modules having specialized hardware and/or software as required.

Transaction processing application 140 may correspond to one or more processes to execute modules and associated specialized hardware of transaction processor server 130 to process a transaction and/or provide another service to end users of transaction processor server 130, which may include processes for electronic transaction processing during VC services. In some embodiments, transaction processing application 140 may correspond to specialized hardware and/or software used by a user associated with first client device 110 and/or second client device 120 to establish a payment account and/or digital wallet, which may be used to generate and provide user data for the user, as well as process transactions. The transactions may include those that occur during a video conference, such as video conferences 152, which may be provided and/or hosted by video conferencing services 150 with first client device 110 and/or second client device 120. In various embodiments, financial information may be stored to the account, such as account/card numbers and information. A digital token for the account/wallet may be used to send and process payments, for example, through an interface provided by transaction processor server 130. When signing up for accounts and onboarding users, links and/or processes to perform these actions may be provided to first client device 110 and/or second client device 120 during video conferences 152 using VC pay operations 114 and 124.

The payment account may be accessed and/or used through a browser application and/or dedicated payment application executed by first client device 110 and/or second client device 120 and engage in transaction processing through transaction processing application 140. Transaction processing application 140 may process the payment and may provide a transaction history to first client device 110 for transaction authorization, approval, or denial. In further embodiments, transaction processing application 140 may utilize VC transaction operations 142 to provide this electronic transaction processing via video conferencing applications 112 and 122 on first client device 110 and second client device 120. VC transaction operations 142 may be used to interface with VC pay operations 114 and 124 through one or more APIs and API calls that enable integrations with video conferencing applications 112. Further VC transaction operations 142 may interface with APIs of video conferencing services 150 through additional APIs and API calls, which allow data exchange during video conferences 152.

VC transaction operations 142 of transaction processing application 140 may be used to extract and/or determine transaction data 144 and/or user identifiers 146, which may be used to populate graphical icons with one or more user interfaces of video conferencing application 112 and 122. The graphical icons may be used to initiate transaction processing and/or onboard for an account with transaction processing application 140. Transaction data 144 may correspond to a payment and/or item to be processed when a graphical icon is selected, where transaction data 144 may be loaded to transaction processing when a user interacts with a graphical icon for electronic transaction processing during video conferences 152. User identifiers 146 may be used for account lookup and association with users in video conferences 152. User identifiers 146 may be extracted and/or determined from video conferences 152 using one or more API calls, plug-ins, and/or operations. Once a transaction is generated, transaction processing operations 148 may be executed to process a transaction, which may include access a payment instrument or funds from the account and debiting or crediting funds between accounts. Transaction processing operations 148 may be used to exchange funds internally and/or with other payment networks, as well as generate transaction histories.

In various embodiments, transaction processor server 130 includes other applications 132 as may be desired in particular embodiments to provide features to transaction processor server 130. For example, other applications 132 may include security applications for implementing server-side security features, programmatic client applications for interfacing with appropriate APIs over network 160, or other types of applications. Other applications 132 may contain software programs, executable by a processor, including one or more GUIs and the like, configured to provide an interface to the user when accessing transaction processor server 130, where the user or other users may interact with the GUI to more easily view and communicate information. In various embodiments, other applications 132 may include additional connection and/or communication applications, which may be utilized to communicate information to over network 160.

Additionally, transaction processor server 130 includes database 134. Database 134 may store various identifiers associated with first client device 110 and/or second client device 120. Database 134 may also store account data, including payment instruments and authentication credentials, as well as transaction processing histories and data for processed transactions including those processed during video conferences 152 using VC pay operations 114 and 124. Database 134 may store received data associated with a video conference, such as user data, transaction data, and the like that is extracted and/or determined using VC pay operations 114 and 124. For example, database 134 may store data for the video conference in order to provide and populate graphical user interface icons for processing payments and transactions, requesting signup and/or onboarding, and/or holding transferred or paid funds until account signup.

In various embodiments, transaction processor server 130 includes at least one network interface component 136 adapted to communicate with first client device 110, second client device 120, VC services 150, and/or another device/server over network 160. In various embodiments, network interface component 136 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

VC services 150 may correspond to an external platform, server, and/or device separate from transaction processor server 130 that may provide some VC services to users, which may be integrated with transaction processor server 130, for example, for transaction processing during VC services and VC content delivery. VC services 150 may provide videotelephony or video teleconference services, such as for the transmission and reception of audiovisual signals and content of users during a meeting in real-time or near real-time between users. Thus, VC services 150 may be used to establish video conferences 152, and thereafter allow users to join and video chat or converse with each other. VC services 150 may include one or more APIs exposed to and integrated with transaction processor server 130, such as with APIs of transaction processing application 140. This may allow for data exchanges, such as to extract or retrieve user data and/or transaction data used to process transactions between users in video conferences 152. Further, the APIs may be used to populate, display, configure, and/or change graphical interface icons in video conferences 152 and associated with participant users, such as based on user identifiers, associated accounts, and/or login or onboarding processes and links. In further embodiments, the APIs, integrations, and exchanged API calls may also or instead be with first client device 110 and/or second client device 120, such as with video conferencing applications 112 and/or 122.

In various embodiments, transaction processor server 130 may interface with VC services 150 via one or more APIs services or applications of transaction processor server 130 and VC services 150, which allows for data exchange. This may include platforms and APIs for conducting one or more of video conferences 152 on first client device 110 and second client device 120, including web browsers accessing webpages for video conferences 152 and/or resident software applications for video conferences 152. In this regard, VC services 150 may provide additional to first client device 110, second client device 120, and/or transaction processor server 130 during VC between different users, such as media content, audiovisual content, chat features and data, transaction processing data and options, user identifiers and/or usernames, and the like.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
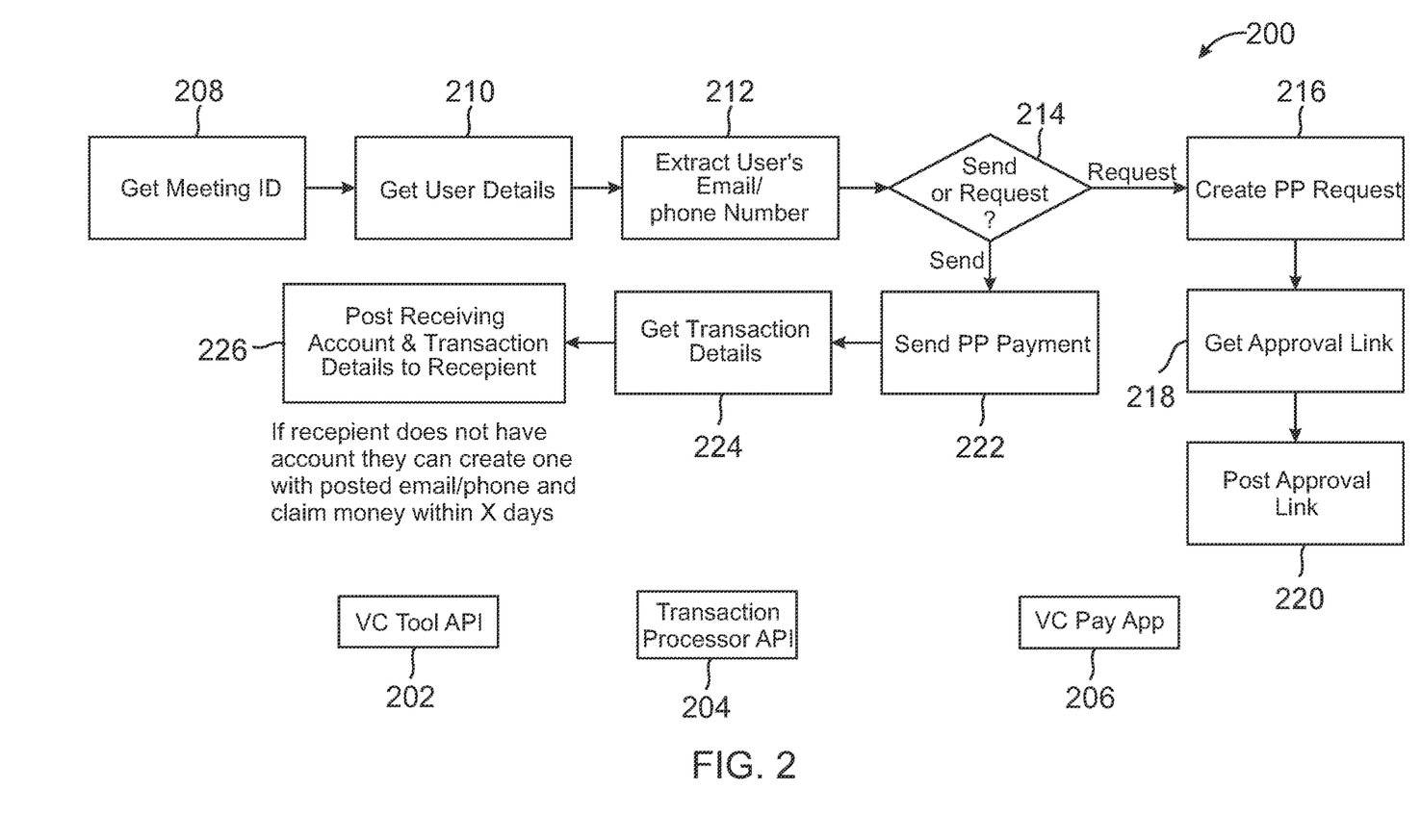
FIG. 2 is an exemplary flow diagram enabling user to user interactions using an external service provider during a video conference, according to an embodiment.

FIG. 2 is an exemplary flow diagram 200 enabling user to user interactions using an external service provider during a video conference, according to an embodiment. Flow diagram 200 shows interactions performed through or via a VC tool API 202 that may correspond to one or more APIs provided by VC services 150 discussed in reference to system 100 of FIG. 1 and a transaction processor API 204 that may correspond to one or more APIs provided by transaction processor server 130, which may interface with a VC pay app 206 associated with VC pay operations 114 and/or 124, discussed in reference to system 100.

In flow diagram 200, interactions are shown between VC tool API 202, transaction processor API 204, and VC pay app 206. For example, in an interaction 208, a meeting identifier (ID) may be obtained for a video conference that may be initiated via VC tool API 202. For example, VC tool API 202 may be provided by a web application and/or resident software application that enables VC services between users. In this regard, VC tool API 202 may be utilized between different users to provide communication services that stream and/or transmit, in real-time or near real-time, audiovisual data between different devices. VC tool API 202 may therefore allow for exchange of at least audio content between different users and may further output a user interface that includes images, representations, video content, and the like of different users during the video conference.

The meeting ID obtained at interaction 208 may correspond to a unique ID assigned to the particular meeting or video conference that allows for unique identification of the communication session. In this regard, the meeting ID may be encrypted, digitally signed, or the like, or may further include authentication credential and/or mechanisms, that enables limited user access and/or use of the video conference. Further, the meeting ID may be associated with and/or enable transaction data to be associated with the corresponding video conference. VC tool API 202 may further obtain, at an interaction 210, user details for the video conference. The user details may correspond to user data that uniquely identifies users, including, but not limited to, an email address, a phone number, a name, an address, personally identifiable information (PII), know your customer (KYC) information, tax or government identifiers, and/or the like. VC tool API 202 may obtain such information from the data of the video conference and/or the data of the members to the video conference.

At an interaction 212, VC pay app 206 extracts user emails and/or phone numbers from the user details obtained by VC tool API 202 at interaction 210. VC pay app 206 may therefore correspond to a plug-in, application process or operation, and/or stand-alone device software application, which may interact with VC tool API 202 in order to determine user data. The user data may correspond to email addresses and/or phone numbers, which uniquely identify users and/or accounts with a transaction processor service. Other data that uniquely identifies users may also be extracted and/or the data may be used in conjunction with other known data (e.g., device data and/or fingerprints) to determine a trust score in identifying a user. Once the extracted user data is determined, one or more user interfaces may be populated with interface icons or elements enabling transaction processing between different VC participants. Once such identifying data is determined and output to users, at an interaction 214, a send or request process for electronic transaction processing is initiated by a user via transaction processor API 204. This may correspond to a request to send an outgoing payment or amount of funds, or, conversely, request that another user pay or transfer an incoming amount of funds.

If the selection is for a request of an amount for electronic transaction processing from another user, at an interaction 216, transaction processor API 204 creates a payment request. The request may be from the user initiating the transaction, for example, by selecting the graphical user interface icon associated with payment processing operations with another user. This generates an operation to begin payment processing operations between two users with an online transaction processor, such as transaction processor server 130 in system 100. The transaction processor may then execute computing processes in order to enable the electronic transaction processing, which may include extracting and/or determining user identifiers for accounts of the users in the transaction (e.g., via email addresses, phone number, or the like), as well as transaction data for a transaction associated with the video conference.

At an interaction 218, an approval link may be generated via transaction processor API 204 to request a payment by a requestor from another user within the video conference. The approval link may enable the other user to approve of transaction processing and a payment to the requestor. Thereafter, at an interaction 220, the approval link is posted, for example, to the other user that is sending the payment or funds to the requestor via VC tool API 202. Posting of the link may include populating an approval option, link, or the like in an interface, sending a message via SMS, email, or the like, or otherwise providing an option to approve of the request for a payment to the requestor. The approval link may therefore initiate a process to authenticate and approve electronic transaction processing between an account of the requestor of payment and an account of the sender of the payment.

If, at interaction 214, a send request is instead selected via a graphical interface icon within a user interface for the video conference, interaction 214 may proceed to an interaction 222 whereby a payment may be sent to another user in the video conference via transaction processor API 204. The payment may be debited from an account of the sending user that selected the icon and may be transferred or paid to another user that was selected within the user interface. Selection between the different options may occur via usage of different colored or identified icons (e.g., one red or negative (e.g., a minus sign) for outgoing payments and one green or positive (e.g., a plus sign) for incoming payments, etc.). In order to properly debit, at an interaction 224, transaction details are obtained from the video conference via transaction processor API 204. These details may be preset for the video conference or may be extracted in real-time during the video conference based on additional information presented within the video conference and/or attributed to the video conference (e.g., linked data, metadata, or the like).

Once the transaction details are determined, at an interaction 226, the receiving account and transaction details are posted to the recipient of the payment via VC tool API 202. The details, account, and/or other information may be provided within a user interface for the video conference where the payment was facilitated. Further, this information may be sent via an out-of-channel communication to another identifier of the user, such as an email address or phone number. If the recipient is not onboarded with the online transaction processor for an account and/or digital wallet services, the amount may be held in an intermittent account, such as an escrow account, while the recipient onboards and establishes an account with the transaction processor. This may allow the recipient a time period to collect their payment after the initial payment processing and video conferencing occurs. However, if this time lapses, the payment may be reversed, and the funds provided back to the original payor in order to resolve the transaction.

Figure 3:
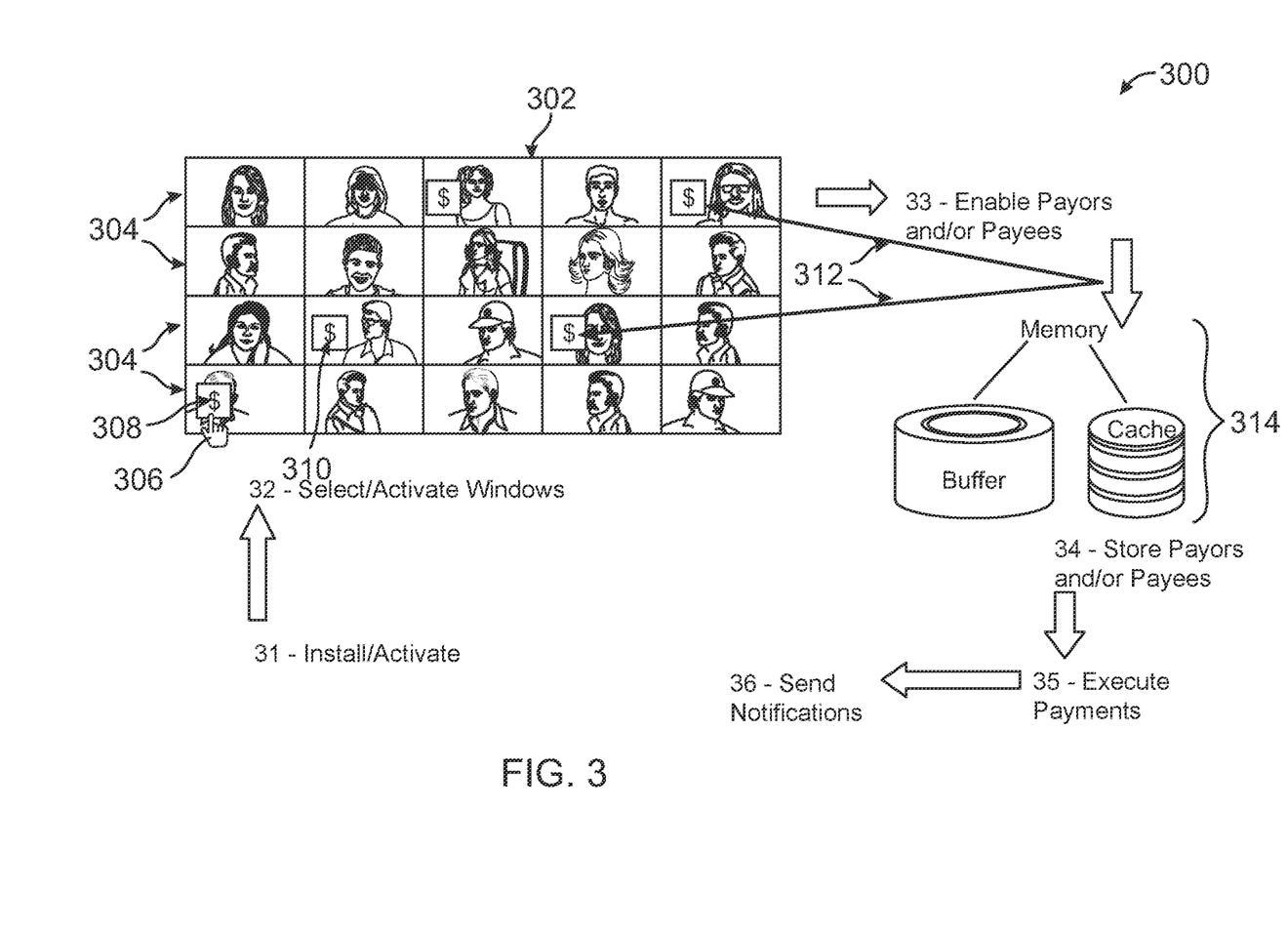
FIG. 3 is an exemplary user interface of a video conference that enables user to user interactions with an external service provider, according to an embodiment.

FIG. 3 is an exemplary user interface 300 of a video conference that enables user to user interactions with an external service provider, according to an embodiment. User interface 300 in FIG. 3 may be presented on a client device, such as first client device 110 and/or second client device 120 when displaying a video conference between different users. In this regard, user interface 300 may be displayed by video conferencing applications 112 and 122 and may include operations and graphical user interface icons provided by VC pay operations 114 and 124, as discussed in system 100 of FIG. 1.

For example, user interface 300 may initially be configured to enable and present one or more icons at a step 31. At step 31, a VC payment application, operations, and/or plugin is installed and/or activated on a client device for user interface 300. This may correspond to installing a plugin on a browser or browser application of a client device. In other embodiments, the operations may be activated as part of a client installation package or may be its own separate software application. The plug-in, application, and/or software install package may be performed using a personal computer, tablet, mobile phone, or the like. Further, televisions with installed applications, such as smart televisions, may also enable the steps and components of user interface 300, which may allow presentation on the television and interaction via a remote control. Further, at step 31, user data for users may be extracted using the installed plug-in, operations, and/or application. This may be performed when a video conference is initiated, started, or when joining an existing video conference such that an email address, phone number, or the like may be determined from participants in a video conference. Further, user data may be continually or periodically refreshed and re-determined in order to identify new VC participants and/or remove participants that may have left.

At step 32, windows may now be selected and/or activated in order to enable payors or payees, as well present graphical user icons for enabling payments between participants in the video conference. For example, in user interface 300, a video conference 302 is shown, where windows 304 are shown as individual interface cells or windows within user interface 300 that show a video of each individual video conference participant. The video may be streamed into windows 304, and a cursor icon 306 may be used to interact with windows 304 and/or other components of user interface 300. For example, cursor icon 306 may be used to hover over each of windows 304 and select a pay icon 308 for interaction. In some embodiments, a computing device displaying video conference 302 may correspond to a personal computer, mobile phone, tablet computer, or the like. In such embodiments, video conference 302 may be displayed in a software application or web browser. However, a smart television having an application may also display video conference 302. In such embodiments, the television may display windows 304 through the application and navigation between windows 304 may be performed using a remote control. Thus, cursor icon 306 may be moved using the remote control to one or more of windows 304 and/or to select pay icon 308.

Interaction between cursor icon 306 and pay icon 308 may include selection of pay icon 308, movement of pay icon 308 to a particular one of windows 304, and/or other interactions that may show an intent to process an incoming or outgoing payment (e.g., to send a payment or request receipt of a payment). In some embodiments, pay icon 308 may include different colors and multiple of pay icons 308 may be used in interface 300 and/or with windows 304 in order to show an outgoing or incoming payment. For example, green or white may be used to represent a request for a payment (e.g., a credit), while red or black may be used to show that a payment is to be sent (e.g., a debit from an account). Thus, an additional pay icon 310 may represent other types of electronic transaction processing that may be performed during video conference 302, such as payments with a different user, different types of payments, and the like.

At step 33, multiple payors and/or payees are enabled, such as through icon enablement 312 that populates and presents graphical user interface icons within windows 304. Icon enablement 312 may enable and present the graphical user interface icons within video conference 302 so that payment may be enabled. At a step 34, the payors and payees that are enabled are stored in a buffer 314 and cached so that the list may be accessed and/or retrieved, for example, in order to be utilized as identifiers and/or account data that may be processed with transaction data when processing transactions between different participants of video conference 302. The list that is stored in buffer 314 is also frequently refreshed during video conference 302 so that the list may be current, and users that are added or leave video conference 302 are updated. This may allow for windows 304 to be refreshed with new interface icons, which may also occur when users onboard or sign up for an account, and an interface icon may change or be added in order to show availability for transaction processing during video conference 302.

At a step 35, payments may be executed or processed between different participants of the video conference. For example, a single or multicast payment may be executed between transaction participants. A single swipe and/or mouse click may initiate a transaction, or a selection of an icon may initiate the transaction and thereafter additional transaction information may be required. Where a single or few clicks may be used, a confirmation may be required and/or transaction data may be fetched for video conference 302. The transaction data may be preloaded and/or set with video conference 302. Where additional transaction data is required, a pop-up menu, interface, or window may be presented to enter additional data (e.g., via the plug-in, application operations, and/or application). Accounts may be identified using the extract user data and identifiers from step 31. Once confirmation of payment is received and the payment is processed, a notification may be sent to the transaction participants at step 36. The notification may show the debit or credit amount to each account in the transaction. Where an account is not established by a receiving user in the transaction, a sign-up link or process may be sent to the user and identification of held funds in a temporary account. The notification may be provided via email, text message (e.g., SMS), chat message (e.g., public or private chat during video conference 302), and/or through a visual alert on a device. The device may correspond to a computing device, such as a personal computer, mobile phone, tablet computer, or the like. Further, where a smart television is used, the notification may be presented by the television as an audio, image, video, or audiovisual content.

Figure 4:
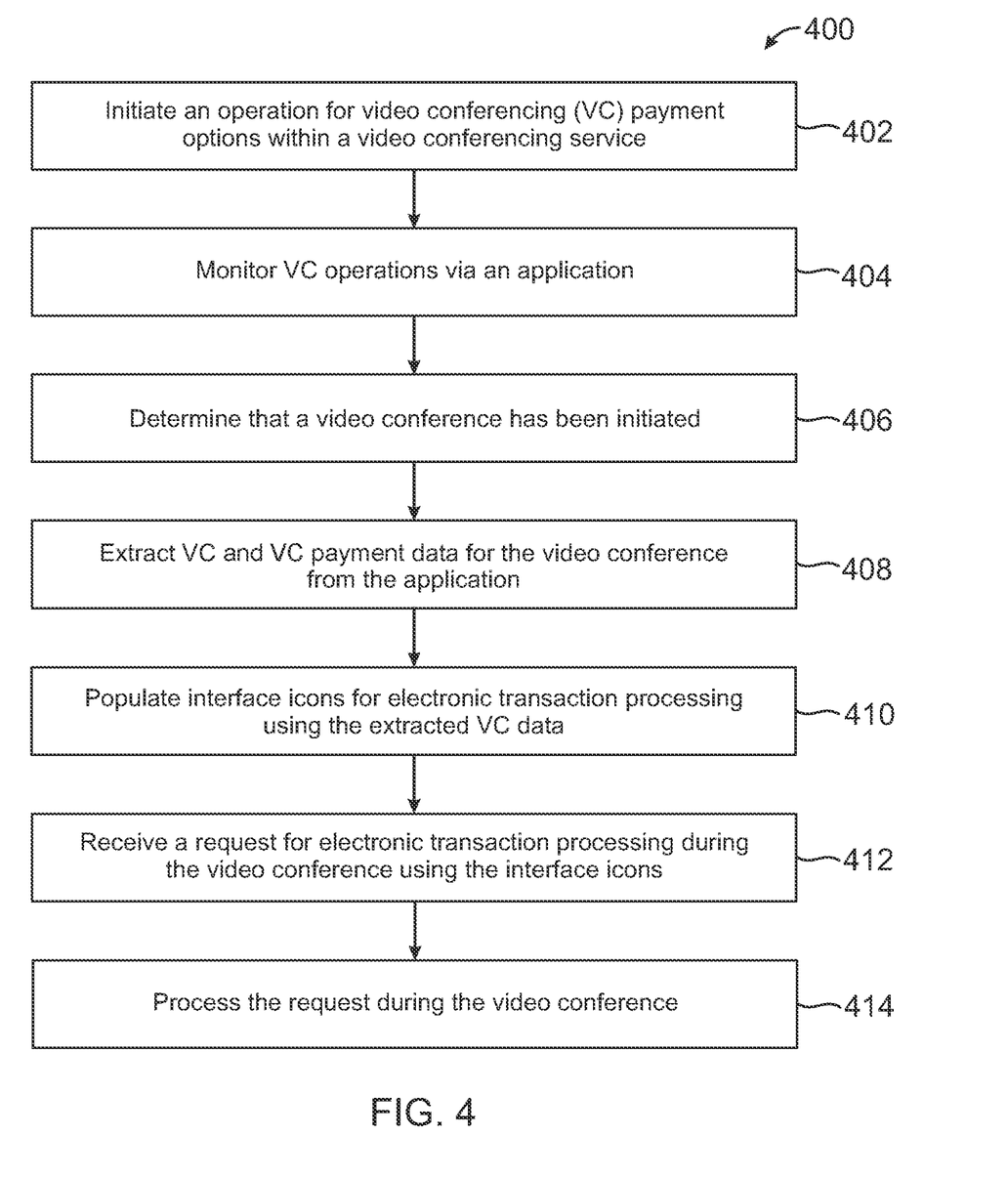
FIG. 4 is a flowchart for enabling user to user interactions in multi-user video conference applications, according to an embodiment.

FIG. 4 is a flowchart 400 for enabling user to user interactions in multi-user video conference applications, according to an embodiment. Note that one or more steps, processes, and methods described herein of flowchart 400 may be omitted, performed in a different sequence, or combined as desired or appropriate.

At step 402 of flowchart 400, an operation for video conferencing (VC) payment options is initiated with a video conference source, such as a video conferencing application, web browser and webpages, and/or online VC service and platform. Initiation may include installing and/or activating a device-side computing (e.g., on a computing device, television, or the like), such as a plug-in, software application installation package, resident software application, or the like. Further, initiating and enabling the VC payment options may include account signup for an account with an online transaction processor in order to perform the VC payment options. At step 404, VC operations are monitored via an application. Thus, after initiating the VC pay options, the corresponding device-side component may monitor for when a video conference occurs via an application including web browsers and/or resident device software applications. When an application is initiated, a webpage for a video conference is visited, a video conference is joined, and/or a meeting identifier is detected and extracted, a video conference may be detected for the VC payment options based on initiation of such options using the device-side component.

At step 406, it is determined that a video conference has been initiated. This may occur when a meeting or video conference identifier is detected as being used to access and join a video conference. At step 408, when the video conference is detected, VC and VC payment data for the video conference is extracted from the application. The VC data may include the meeting identifier or other data to identify the particular video conference and any associated data (e.g., a list of users, transaction data, user and/or transaction identifiers, and the like). Further, extraction of VC payment data may include extracting specific user identifiers for users within the video conference. When the VC and/or VC payment data is extracted, it may be periodically or continually refreshed in a cache so that new user identifiers and/or changes to transaction data may be determined.

At step 410, interface icons for electronic transaction processing is populated within a user interface and/or windows of a GUI using the extracted VC data. The interface icons may be populated and presented, or caused to be displayed, based on user identifiers from the extracted VC data. For example, the user identifiers may be used to determine accounts and account identifiers, as well as payment instruments, for users within a video conference. Graphical user interface icons may correspond to an indication that electronic transaction processing is available. Further, with users that do not have an account with an online transaction processor for the electronic transaction processing, the icons may also include a link or process to initiate onboarding and signing up for an account. Thus, the icons may be used to further sign up for payment services.

At step 412, a request for electronic transaction processing is received during the video conference using the interface icons. The request may be to send or receive a payment or funds from one or more other users, which may be a single transaction or a multicast transaction (e.g., multiple outgoing or incoming payments, such as a request from a user to receive a payment for a transaction or service, or a request to send payments to multiple users). The request may also identify a payment instrument, or the account identified using an extracted user identifier may be used to select a default payment instrument in order to send a payment. In some embodiments where a sender does not have an account, a credit/debit card, or other financial data, and additional information (e.g., CVV and/or other authorization data) may be provided to approve and process a payment, and the sender may then be onboarded using the provided data.

At step 414, the request is processed during the video conference. Payment may be processed using the identified account and/or payment instrument during the video conference in order to send funds to another user. Funds may then be deposited and/or credited to an account of the recipient. Where an account by a sender or recipient is not established, additional signup processes may be initiated and completed by the sender and/or recipient. For example, the recipient may be provided a link or process in order to sign up for an account and release the held funds for the payment from the sender. Further, the sender may provide payment card data (e.g., a credit/debit card) or other financial information to send a payment, and the information may be used with an extracted identifier from the video conference to perform initial onboarding. Thereafter, the sender may complete further onboarding and/or authorization for the account signup and outgoing payment. Further, after processing the request, an in-band or out-of-band notification may be sent, such as an email, text message, chat message, and/or alert or display within the video conference. A transaction history may also document the processed transaction, and sent to users, as well as fulfillment of any items and/or shipping may then be processed.

Figure 5:
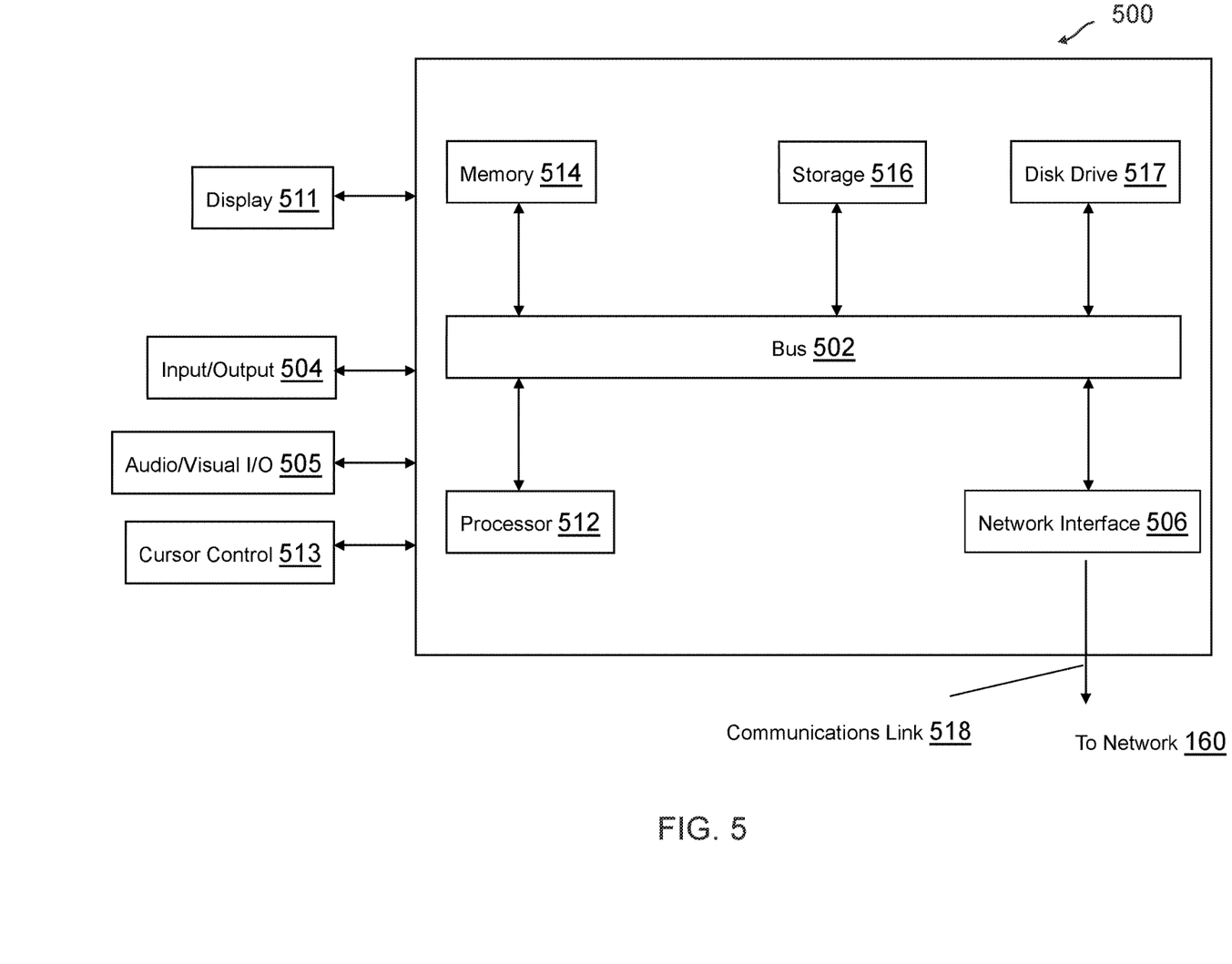
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on gift cards, other types of funding sources that can be used to fund a transaction and provide additional value for their purchase are also within the scope of various embodiments of the invention. Thus, the present disclosure is limited only by the claims.

What is claimed is:

1. A service provider system comprising:
    a non-transitory memory; and
    one or more hardware processors coupled to the non-transitory memory and configured to read instructions from the non-transitory memory to cause the service provider system to perform operations comprising:
        determining, using a video conferencing payment operation, that a plurality of users are active in a video conference using a plurality of computing devices, wherein the video conference is initiated in a video conferencing application separate from the service provider system;
        extracting, from the video conferencing application using the video conferencing payment operation during the video conference, user identifiers associated with the plurality of users;
        populating, using the video conferencing payment operation within user interfaces for the video conference on the plurality of computing devices, an interface icon that enables electronic transaction processing for transaction data between the plurality of users during the video conference;
        receiving, from a first one of the plurality of computing devices for a first one of the plurality of users during the video conference using the interface icon, a request for the electronic transaction processing with a second one of the plurality of users;
        determining, from the extracted user identifiers, a first identifier and a second identifier for the first one and the second one of the plurality of users respectively; and
        processing, during the video conference, the transaction data for the electronic transaction processing using the first identifier and the second identifier.

2. The service provider system of claim 1, wherein the video conferencing payment operation comprises one of a browser plug-in for a browser application corresponding to the video conferencing application, a resident software application of the service provider system, or a client install software package for the video conferencing application.

3. The service provider system of claim 1, further comprising first application programming interfaces (APIs) integrated with the video conferencing payment operation to exchange API calls for the extracting, wherein the video conferencing application comprises a second API that interfaces with the video conferencing payment operation during the extracting the user identifiers from the video conferencing application.

4. The service provider system of claim 1, wherein the service provider system comprises a plurality of APIs, and wherein the operations further comprise:
    authenticating at least a portion of the plurality of users during the video conference using a first one of the plurality of APIs and the user identifiers; and
    identifying user accounts for the at least the portion of the plurality of users using a second one of the plurality of APIs and the user identifiers.

5. The service provider system of claim 1, wherein the receiving the request comprises detecting a movement of the interface icon on the first one of the plurality of computing devices to an interface cell displaying a video of the second one of the plurality of users.

6. The service provider system of claim 5, wherein the interface icon comprises two interface icons each having a color associated with one of a payment request or a debit request, and wherein prior to the processing the transaction data, the operations further comprise:
    determining whether the request for the electronic transaction processing is the payment request or the debit request by the first one of the plurality of users to the second one of the plurality of users based on the color used for the movement of one of the two of the interface icons.

7. The service provider system of claim 5, wherein the first one of the computing devices comprises a smart television having the video conferencing application, and wherein the movement comprises a remote controller movement of the interface icon to the interface cell.

8. The service provider system of claim 1, wherein the receiving the request comprises receiving a selection of the interface icon on the first one of the plurality of computing devices in an interface cell displaying a video of the second one of the plurality of users using one of a touch screen input or a mouse movement.

9. The service provider system of claim 1, prior to the determining the first identifier and the second identifier, the operations further comprise:
    determining that the second one of the plurality of users does not have an account with the service provider system; and
    executing an operation to onboard the second one of the plurality of users for the account with the service provider system, wherein the operation comprises one of:
        transmitting a digital communication comprising a sign-up link for the account with the service provider system, wherein the digital communication comprises one of an out-of-band communication to a device associated with the second identifier or a private message within the video conference, or
        establishing the account using the second identifier for the second one of the plurality of users and a received payment card from the second one of the plurality of users for the electronic transaction processing.

10. The service provider system of claim 1, wherein the operations further comprise:
    transmitting a digital communication associated with the processing the transaction data to the first one of the plurality of users, wherein the digital communication comprises one of an email, a text message, or an on-screen visual alert within the video conference.

11. The service provider system of claim 1, wherein the user identifiers comprise at least one of a username, an account identifier, an email address, or a phone number, and wherein the operations further comprise:
  performing a lookup of account identifiers for the plurality of users using the user identifiers.

12. A method comprising:
  detecting, on a first device of a first user using an installed computing process for a transaction processor, an initiation of a video conference with a plurality of devices of a plurality of users, wherein the initiation of the video conference occurs through a video conferencing application associated with the installed computing process;
  determining, via the installed computing process, contact identifiers for the plurality of users and the first user for the video conference, wherein the determining comprises extracting the contact identifiers for at least the plurality of users using the video conferencing application;
  causing to be displayed, in a user interface for the video conference in the video conferencing application on the first device, a graphical interface icon that indicates at least one of the plurality of users is available for processing an electronic transaction with the first user;
  receiving, from the first device via the installed computing process, an interaction with the graphical interface icon during the video conference, wherein the interaction comprises a request to process the electronic transaction between the first user and a second user of the plurality of users; and
  processing, by the transaction processor outside of the video conferencing application, the electronic transaction during the video conference using the contact identifiers.

13. The method of claim 12, wherein prior to the detecting, the method further comprises:
  requesting a permission to access and extract data via the video conferencing application; and
  activating the installed computing process on the first device based on receiving the permission.

14. The method of claim 12, wherein the interaction is received via at least one device component comprising a microphone, a camera, a touch screen interface, a keyboard, or a mouse.

15. The method of claim 12, wherein the electronic transaction comprises a multicast transaction to the plurality of users by one of the first user or the second user, and wherein the multicast transaction comprises a preregistered cost associated with the video conference.

16. The method of claim 12, wherein the processing the electronic transaction comprises:
  determining that the second user does not have an account with the transaction processor, wherein the electronic transaction is a payment to the second user;
  storing the payment to the second user in a temporary account; and
  notifying the second user with a sign-up link and the payment in the temporary account.

17. The method of claim 12, further comprising:
  buffering a user list of the plurality of users based on the contact identifiers extracted from the video conferencing application;
  storing the user list with the transaction processor; and
  refreshing, based on an elapsed time since a last refresh of the user list or a change of users participating in the video conference, the user list using the installed computing process.

18. The method of claim 12, further comprising:
  determining a portion of the plurality of users do not have accounts with the transaction processor based on the contact identifiers; and
  identifying the portion of the plurality of users in the user interface for the video conference.

19. A non-transitory machine-readable medium having stored thereon machine-readable instructions executable to cause a machine to perform operations comprising:
  detecting, on a first device of a first user using an installed computing process for a transaction processor, an initiation of a video conference with a plurality of devices of a plurality of users, wherein the initiation of the video conference occurs through a video conferencing application associated with the installed computing process;
  determining, via the installed computing process, contact identifiers for the plurality of users and the first user for the video conference, wherein the determining comprises extracting the contact identifiers for at least the plurality of users using the video conferencing application;
  causing to be displayed, in a user interface for the video conference in the video conferencing application on the first device, a graphical interface icon that indicates at least one of the plurality of users is available for processing an electronic transaction with the first user;
  receiving, from the first device via the installed computing process, an interaction with the graphical interface icon during the video conference, wherein the interaction comprises a request to process the electronic transaction between the first user and a second user of the plurality of users; and
  processing, by the transaction processor outside of the video conferencing application, the electronic transaction during the video conference using the contact identifiers.

20. The non-transitory machine-readable medium of claim 19, wherein prior to the detecting, the operations further comprise:
  requesting a permission to access and extract data via the video conferencing application; and
  activating the installed computing process on the first device based on receiving the permission.

* * * * *